United States Patent Office 3,662,037
Patented May 9, 1972

3,662,037
PROCESS FOR PREPARING OPEN RING TETROSE AND TRIOSE PHOSPHATE ACETALS AND PHOSPHATE KETALS
Hans Ulrich Bergmeyer, Erich Haid, and Michael Nelboeck-Hochstetter, Tutzing, Upper Bavaria, and Otmar Pelz, Feldafing, Upper Bavaria, Germany, assignors to Boehringer Mannheim G.m.b.H., Mannheim, Germany
No Drawing. Filed July 1, 1969, Ser. No. 838,345
Claims priority, application Germany, July 5, 1968, P 17 68 844.7
Int. Cl. C07f 9/02
U.S. Cl. 260—968        14 Claims

ABSTRACT OF THE DISCLOSURE

Process for preparing open ring tetrose and triose phosphate acetals and phosphate ketals comprising acetalizing or ketalizing free aldose or ketose phosphoric acid or an acid salt thereof in the anhydrous state in an organic solvent, without causing simultaneous esterification of free phosphoric acid group.

---

This invention relates to an improved process for preparing open ring tetrose and triose phosphate acetals and phosphate ketals.

Tetrose and triose phosphates are important intermediate products formed in the intermediate metabolism. For example, erythrose-4-phosphate (E-4-P) and glycerinaldehyde-3-phosphate (GAP) are formed in the main course of the oxidative degradation of glucose (the hexose phosphate shunt) and in the fixation of carbon dioxide in green leaves and some microorganisms (carbon dioxide assimilation), and GAP also occurs in the anaerobic synthesis and degradation of glucose in glycolysis and gluconeogenesis. This in part points up the considerable importance which these compounds have gained as biochemical reagents in metabolism studies, particularly in determining the activity of the enzymes that make them react.

One disadvantage associated with the open ring phosphorylated compounds is their great instability. The stable form in which these compounds are stored, therefore, is their corresponding acetals or ketals. Prior to use, these acetals or ketals are converted by acid hydrolysis back into the enzymatically active free aldoses and ketoses. The aldoses and ketoses are isomeric forms in which the same compound occurs, and for the sake of simplicity only the aldoses will be mentioned in the following description and this is to be interpreted to mean that what is said with respect to aldoses is applicable in like manner to the corresponding ketoses.

The acetal forms of the phosphorylated tetroses and trioses have hitherto been obtained by difficult chemical syntheses involving a number of stages, and consequently the overall yields have been poor; (see E. Ballou et al., J. AM. Chem. Soc. 77, 5967 (1955) and 78, 1659 (1956)). Direct acetalization has been considered to be impossible since in this reaction the simultaneous esterification of the phosphoric acid group was to have been expected.

Surprisingly, in accordance with the invention it has now been found that, an acetalization of the free aldose phosphoric acids or their acid salts in the anhydrous state in an organic solvent can be carried out and that the desired acetals can thereby be obtained in an excellent yield, without any esterification of the phosphoric acid group taking place.

The process according to the invention for the production of open ring tetrose and triose phosphate acetals or ketals comprises preparing a phosphorylated aldose or ketose in an anhydrous state, in free form or in the form of its acid salt, dissolving the thusly obtained aldose or ketose in an organic solvent and subjecting the aldose or ketose to treatment with a conventional acetalizing or ketalizing agent.

The phosphorylated aldoses or ketoses required for use in accordance with the invention include for instance the phosphates of D- and L-glycerinaldehyde, dioxyacetone, D- and L-threose, D- and L-erythrose and erythrulose.

The phosphorylated aldoses or ketoses can be prepared by the conventional methods. Thus it is known to prepare the phosphate esters of the tetroses and troses in the form of their aqueous solutions by several methods, as for example, by the lead tetraacetate cleavege of glucose-6-phosphate according to Criegee with the formation of E-4-P; by the periodate cleavage of fructose-6- phosphate according to Malaprade with the formation of GAP, or by the aldolase cleavage of fructose diphosphate with the formation of GAP and DAP (dihydroxyacetone phosphate). Starting from such aqueous or acetic acid solutions, the phosphate esters can be prepared in anhydrous form, for instance, by precipitation with organic solvents that are miscible with water, or by lyophilization. When the free phosphoric acid ester is present, lyophilization is preferred. The free phosphoric acid esters are advantageously obtained by treatment with ion exchangers where the starting compounds are present in salt form. If the phosphoric acid esters are present in the form of acid salts, it is preferable to prepare them in anhydrous form by precipitation with organic solvents.

The acid salts are preferably used in the form of their alkali salts, particularly as the sodium salts. These are obtained in clumpy-amorphous form by precipitation from aqueous solution using therefor organic solvents. In the lyophilization of the free phosphoric acid ester, however, an oily product is obtained.

The anhydrous phosphoric acid esters of tetroses or trioses or their acid salts thus obtained are then dissolved in a suitable organic solvent. By the term anhydrous there is intended to be included substances which still have a slight moisture content. Surprisingly, this does not interfere with the later acetalization.

The organic solvents used for the acetalization must be inert to the reaction and must be capable of dissolving both the phosphoric acid esters and the acetalizing agent. Both polar and non-polar organic solvents can be used, it being possible to modify the dissolving properties of non-polar solvents, if desired, by the addition of polar solvents. Suitable organic solvents include, for example, the lower alcohols, benzene and its homologs, dimethyl formamide, ethers, esters and the like. Preferably there is employed as organic solvent absolute ethanol.

A small quantity of a strong acid or of an acid salt can be added to the solvent as a catalyst for the acetalization reaction. In the case of the free phosphoric acid esters, the addition of acid is preferably omitted. In the case of the acid salts, however, it is generally better to add acid. Sulfuric acid is preferred as the strong acid, since it can easily be removed later in the form of a difficultly soluble salt. Glacial acetic acid is also particularly suitable for use.

The acetalization is carried out under the usual conditions with the use of the conventional acetalizing agents, o-formic acid triethyl ester and dimethylformamide-dimethylacetal being particularly suitable in this connection. Alcohol and gaseous hydrogen chloride do not give as good results.

The acetalization is carried out at temperatures between about −10 and 40° C. and preferably at about room temperature. The reaction time depends on the acetalizing agent and on the temperature which have been selected. At room temperature, the acetalization takes about 3 to 4 days when o-formic acid triethyl ester is used, and in the case of dimethyl formamide-dimethylacetal, the acetalization takes but a few hours.

In the acetalization of the acid salts, it is desirable to use the more strongly polar organic solvents, such as for example, alcohols or methylene chloride, while in the case of the free acids, even the non-polar organic solvents, such as toluene or benzene, are perfectly suitable.

The purification of the open ring tetrose and triose phosphate acetals that are produced in organic solution in the process of the invention is carried out by neutralization, separation of insoluble components, and removal of the organic phase by distillation. For the neutralization a base is used and preferably a base producing salts which are insoluble in the organic phase, such as barium hydroxide.

The products which are obtained after removal of the organic phase can be still further purified. This purification is carried out, for example, by dissolving the product in a small amount of water, preferably then treating the same with activated charcoal and then heating. If barium hydroxide has been used for the neutralization of the reaction mixture the barium salts then precipitate in microcrystalline form and can be directly filtered off from the hot solution.

The process of the invention permits the preparation of the triose and tetrose phosphate acetals or ketals in a very simple manner, with very good yields, and therefore performs the important service of making this class of compounds easily accessible for the first time.

The following examples further illustrate the present invention, which is not to be considered as limited thereby.

EXAMPLE 1

D-erythose-4-phosphatediethylacetal, barium salt 3.26 g. of D-glucose-6-phosphate (G-6-P, sodium salt) were suspended in 30 ml. of glacial acetic acid, brought into solution by the addition of 7 ml. of water and the solution then diluted with additional glacial acetic acid to make 1200 ml.

A solution of 7.44 g. of lead tetraacetate in 500 ml. of glacial acetic acid and 6.3 ml. of 6 N sulfuric acid were introduced into a dropping funnel, and this solution then added over a period of about 2 hours under strong agitation to the solution of the G-6-PAT room temperature. During the addition, no excess of lead tetraacetate may be present and this was assured by testing with iodine-starch paper.

After the oxidation had been completed and the lead sulfate had precipitated, the latter was removed by centrifugation and the clear remaining liquid lyophilized. There was obtained in a yield amounting to about 3.26 g., a light, white substance containing about 44% enzymatically testable erythose-4-phosphate. This corresponded to a conversion of about 68% of theory. The remainder, which may still contain some glacial acetic acid, does not have to be dried prior to the acetalization on which is then carried out as follows:

The lyophilizate was dissolved in 100 ml. of absolute ethyl alcohol. Following the addition of 10 g. of o-formic acid triethyl ester and 0.25 ml. of concentrated sulfuric acid, the acetalization was carried out in 75 hours at room temperature. The conversion amounted to 90%.

After this period the reaction mixture was neutralized with saturated barium hydroxide solution, the barium sulfate precipitate was centrifuged out and washed several times with water, all of the liquid fraction then being combined. The slightly yellowish solution thus obtained was concentrated in vacuo to the dry state, redissolved in 15 ml. of distilled water, and filtered through active charcoal.

The D-erythrose-4-phosphatediethylacetal was percipitated as a barium salt in microcrystalline form by heating the solution to 80° C. Drying of the white substance which was recovered was carried out under high vacuum over phosphorus pentoxide at room temperature. The yield amounted to 1.5 g., corresponding to 50.5% referred to E-4-P, or 34.3% with reference to the starting D-G-6-P sodium salt.

EXAMPLE 2

The procedure set up in Example 1 was followed with the exception that after the cleavage with lead tetraacetate and the removal by centrifugation of the lead sulfate, the reaction mixture was not lyophilized, but instead was precipitated with chloroform, benzene or some other organic solvent miscible with the glacial acetic acid phase. The E-4-P precipitate thus obtained in the form of an acid sodium salt was directly acetalized using the procedure as described in Example 1, without preliminary drying. The purification procedure and the yield were substantially the same as set out in Example 1.

EXAMPLE 3

D-glycerinaldehyde-3-phosphatediethylacetal, barium salt 6.67 g. of fructose-6-phosphate, disoduim salt (F-6-P) were dissolved in 32 ml. of distilled water, and, under strong agitation at 0° C., a solution of 10 g. of periodic acid in 43 ml. of distilled water was added slowly drop by drop to the F-6-P solution.

After about 1 hour, the sodium iodate crystals which had formed were removed on a suction filter and the clear filtrate freed of alkali ions by using a cation exchanger (i.e., Dowex 50). The eluate from the exchanger was lyophilized. The oily residue thus obtained was dissolved in 100 ml. of toluene. The acetalization was carried out by the addition of 10 g. of o-formic acid ethyl ester and 0.25 ml. of concentrated sulfuric acid, and incubation at room temperature (4 days).

The ethanolic solution was neutralized to pH 7 with cold-saturated barium hydroxide solution and concentrated in vacuo to dryness. The dry residue which was obtained was dissolved in a little distilled water, filtered free of barium sulfate, and clarified with active charcoal. The clear filtrate was heated to 90° C., whereupon the crystalline barium salt of GAP-DA precipitated out. This was filtered off while hot. The precipitate was dissolved in a little ice-cold distilled water and brought to precipitation again by heating to 90° C. The precipitate was filtered off, washed with hot water and dried in vacuo over calcium chloride.

Yield: 2.5 g. GAP diethyl acetal, barium salt, corresponding to about 30% with reference to the starting F-6-P sodium salt.

This example was repeated using benzene in one example and methylene chloride in the other, in place of toluene, with the same results.

EXAMPLE 4

The procedure described in Example 2 was followed for the preparation of GAP diethyl acetal, barium salt. The oily residue after the lyophilization, was dissolved in 100 ml. of absolute ethanol and then acetalized with 10 g. of dimethylformamide-diethylacetal and 0.5 ml. of glacial acetic acid. After 15 hours the solution was neutralized with cold-saturated barium hydroxide solution, concentrated to dryness in vacuo, and further processed as described in Example 2.

Yield: 2.0 g. GAP-DA barium salt, 24.6% with reference to the starting F-6-P sodium salt.

EXAMPLE 5

Dihydroxyacetone phosphate diethyl ketal, barium salt

Over a period of 10 minutes, a solution of 20 g. of phosphoric chloride in 100 ml. of quinoline which had been chilled to —20° C. was added, drop by drop, to a solution of 10 g. dihydroxyacetone in 300 ml. of anhydrous quinoline which had been chilled to the same temperature. The resultant reaction mixture was kept at this temperature until, following about 30 minutes, a thick crystalline mass had formed. The residue was dissolved in about the same volume of ice water and 50 ml. of 25% calcium acetate solution was added, and the mixture neutralized to pH 7 with caustic soda solution. The precipitated calcium phosphate was then removed by filtration, and the dioxyacetone phosphate precipitated out as a calcium salt, from the clear filtrate by the addition of 3 times the volume of ethanol. The precipitate was separated by centrifugation, dissolved in a little distilled water, and freed of calcium by means of a cation exchanger (Dowex 50) in the H form. The eluate was lyophilized, whereupon a yellow, oily residue was obtained. This residue was dissolved in 70 ml. of absolute ethanol, and acetalized with 7 g. of o-formic acid triethyl ester and 0.2 ml. of concentrated sulfuric acid.

After 3 days of standing at room temperature the mixture was neutralized with cold-saturated barium hydroxide solution, filtered free of barium sulfate, and the filtrate concentrated to dryness in vacuo. The residue was dissolved in a little distilled water and clarified with active charcoal. The clear, concentrated filtrate was heated to 90° C. and the dihydroxyacetonephosphatediethylketal barium salt which precipitated out was filtered off while hot. The precipitate was dissolved in a little ice-cold distilled water and reprecipitated by heating again to 90° C., filtered, washed with hot water, and dried in vacuo over calcium chloride.

Yield: 2.2 g. dihydroxyacetonephosphate-diethylketal barium salt, corresponding to about 5% with reference to the starting dihydroxyacetone.

EXAMPLE 6

Glycerinaldehyde phosphate diethyl acetal, barium salt

The procedure which has been described in Example 3 was followed; the solution of the GAP in 100 ml. of absolute ethanol was acetalized with 10 g. of dimethyl formamidediethyl acetal, but without the addition of acid. After about 40 hours, the mixture was neutralized with cold-saturated barium hydroxide solution, concentrated to dryness in vacuo and further processed as described under Example 3.

Yield: 3.0 g. GAP diethyl acetal, barium salt, corresponding to 24.6% of the theory, with reference to the starting F-6-P, sodium salt.

EXAMPLE 7

Glycerinaldehyde-3-phosphate diethyl acetal, dicyclohexylammonium salt

In order to prepare the dicyclohexylammonium salt, which crystallizes particularly well, the barium salt obtained according to Examples 3, 4 or 6, was dissolved in distilled water and the barium precipitated stoichiometrically as a sulfate with an aqueous solution of dicyclohexylammonium sulfate.

The precipitate thereby obtained was centrifuged off and the residue distilled in vacuo to dryness. The partially crystallized residue was then dissolved in warm isopropanol and crystallized at room temperature by the addition of diethyl ether. By further cooling to 0° C., the yield was increased still further. The crystal product was recovered by suction filtering, washed with diethyl ether and dried in vacuo over calcium chloride.

Yield: Approximately 80% of the theory.

EXAMPLE 8

D-threose-4-phosphatediethylacetal, barium salt

The procedure which has been described in Example 1, was repeated but with the exception that 3.26 g. of D-galactose-6-phosphate (sodium salt) was used instead of D-glucose-6-phosphate. The yield amounted to 1.4 g.

We claim:

1. Process for preparing open-ring tetrose and triose phosphate acetals and ketals which comprises dissolving a member selected from the group consisting of triose phosphate aldoses, triose phosphate ketoses, tetrose phosphate aldoses and tetrose phosphate ketoses which has been obtained in substantially anhydrous form from an aqueous solution thereof, in an organic solvent and reacting the aldose or ketose group of said aldoses or ketoses with an acetalizing or ketalizing agent, respectively, wherein said acetalizing or ketalizing agent is a member selected from the group consisting of o-formic acid triethyl ester and dimethyl formamide-diethyl acetal.

2. Process for preparing open-ring tetrose and triose phosphate acetals and ketals which comprises dissolving a member selected from the group consisting of substantially anhydrous triose phosphate aldoses, triose phosphate ketoses, tetrose phosphate aldoses and tetrose phosphate ketoses in an inert organic solvent and reacting the aldose or ketose group of said aldoses or ketoses with an acetalizing or ketalizing agent, respectively, wherein said acetalizing or ketalizing agent is a member selected from the group consisting of o-formic acid triethyl ester and dimethyl formamide-diethyl acetal.

3. Process according to claim 2 wherein said acid salt is an alkali metal salt.

4. Process according to claim 3 wherein said acid salt is a sodium salt.

5. Process according to claim 2 wherein said organic solvent is at least one member selected from the group consisting of lower alcohols, benzene, dimethyl formamide, ethers, esters, toluene, methylene chloride.

6. Process according to claim 5 wherein said organic solvent is ethanol.

7. Process according to claim 2 wherein said reacting is conducted in the presence of a strong acid.

8. Process according to claim 7 wherein said strong acid is sulfuric acid.

9. Process according to claim 2 wherein said reacting is conducted in the presence of glacial acetic acid.

10. Process according to claim 2 wherein said reaction is conducted at a temperature of from —10 to 40° C.

11. Process according to claim 2 which comprises dissolving erythrose-4-phosphate in ethyl alcohol and reacting said erythrose-4-phosphate with o-formic acid triethyl ester in the presence of concentrated sulfuric acid.

12. Process according to claim 2 which comprises dissolving dihydroxyacetone phosphate in ethyl alcohol and reacting said dihydroxyacetone phosphate with formic acid triethyl ester in the presence of concentrated sulfuric acid.

13. Process according to claim 1 wherein said aldose or ketose group member has been obtained in form of the free acid by lyophilization of an aqueous solution thereof.

14. Process according to claim 1 wherein said aldose or ketose group member has been obtained in form of the acid salt by precipitation with organic solvent from aqueous solution.

References Cited

UNITED STATES PATENTS 3,413,381  11/1968  Cyba _____ 260—950 X

OTHER REFERENCES

Wagner et al.: "Synthetic Organic Chemistry," J. Wiley and Sons, Inc., New York (1953), p. 264.

JOSEPH REBOLD, Primary Examiner

A. H. SUTTO, Assistant Examiner

U.S. Cl. X.R.

260—950, 953